May 14, 1946.  L. J. BISHOP  2,400,336
SURGICAL OPERATING APPLIANCE
Filed Jan. 29, 1944
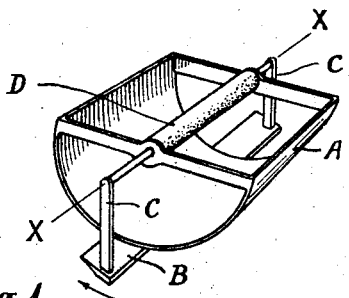
Fig. 1.
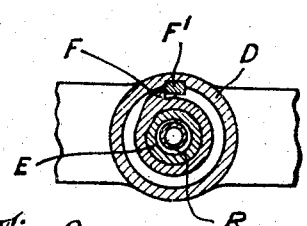
Fig. 2.
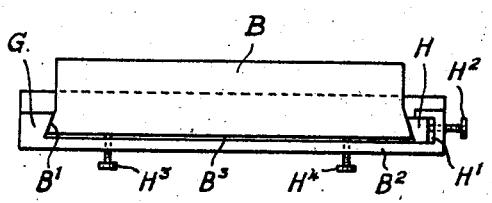
Fig. 3.
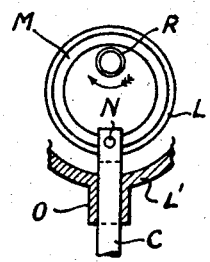
Fig. 4.
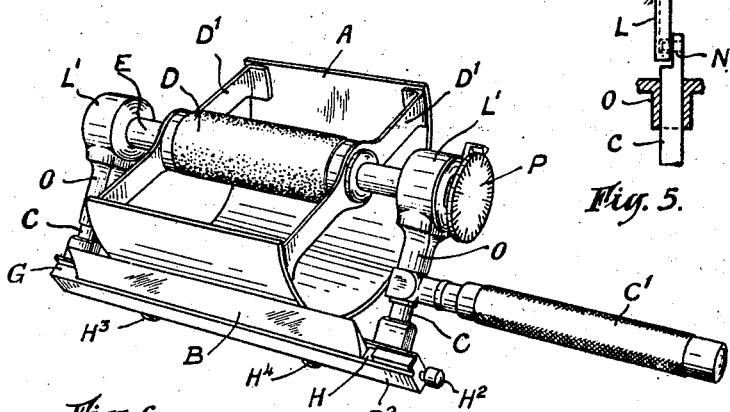
Fig. 6.
Fig. 5.
INVENTOR
LAURENCE JACK BISHOP
BY HIS ATTORNEY.
Francis E. Boyer Patented May 14, 1946

2,400,336

UNITED STATES PATENT OFFICE 2,400,336

SURGICAL OPERATING APPLIANCE

Laurence Jack Bishop, Virginia Water, England

Application January 29, 1944, Serial No. 520,212
In Great Britain February 3, 1943

2 Claims. (Cl. 128—305)

This invention relates to dermatomes, the dermatome being a surgical instrument used in cutting thin sheets of living skin from the body for use in skin grafting operations.

The apparatus as hitherto used consists of a thin semi-cylindrical steel shell around which rotates a blade, the axis of rotation of the blade being the axis of the cylinder. The blade has also a limited axial motion to facilitate cutting, the shaft being allowed to slide through the bearings at the ends of a hand-grip. The distance of the cutting edge from the surface of the drum may be altered to any desired setting by varying by means of screws the length of links, connecting the blade to its spindle.

The dermatome is operated by cementing the area of skin to be cut to the surface of the steel cylinder. The knife is brought into contact with the skin, and set at a distance of about 0.25 mm. from the drum surface. The blade is then moved backwards and forwards, and at the same time rotated around the surface. After the operation a thin sheet of living skin remains attached to the cylinder, from which it is later peeled in readiness for the skin graft.

When operating dermatomes as hitherto employed a distinct danger exists of the surgeon cutting his own wrist when the blade has rotated to the limit of the drum. Furthermore, the bent rod handle attached to the blade support does not offer sufficient control when operating. In addition the blade, which is held by a spring clip, is difficult to insert and remove safely.

The blade setting, upon which the depth of cut depends, and which is adjusted by two separate screws, one at the top of each blade support, is difficult to arrange accurately.

In accordance with the present invention a dermatome is provided comprising a part cylindrical surface, a blade spaced from the said surface and mounted to rotate about the axis thereof, and also to move longitudinally to facilitate cutting, and stop means for limiting the rotation of the blade, the stop means preferably being associated with the blade shaft.

From another aspect of the invention a mechanism is provided for adjusting the cutting position of both ends of the blade simultaneously.

The position of the blade may be adjusted in the holder by screws, and the holder and blade together by a cam mechanism.

A handle which may be grasped by the whole hand, and is preferably cylindrical in form, may be attached to the blade support to facilitate movement of the blade.

The blade may be held between movable jaws at its ends.

The accompanying drawing illustrates one form of dermatome made in accordance with the present invention.

Fig. 1 illustrates in perspective view the principle on which the device is operated.

Fig. 2 illustrates a section through the centre shaft and the stop.

Fig. 3 illustrates in elevation the blade and blade holder.

Figs. 4 and 5 illustrate the cam mechanism for adjusting the blade setting.

Fig. 6 illustrates in perspective view the assembled mechanism.

As illustrated, a hollow cylindrical steel shell or drum A co-operates with a blade B which rotates about the axis XX and is carried by links C, the blade being rotated by means of a handle $C^1$ which is suitably secured to one of the links.

A drum A is held by a hand-grip D suitably secured to the transverse members $D^1$ of the drum. The shaft E passes through the bearings carried in the cross members $D^1$. The shaft E carries the links C which support the blade, and through these links the blade is operated by means of the handle $C^1$.

In the form shown the blade B is prevented from rotating further than the edge of the drum A by a stop F attached to or integral with the centre shaft E. A key $F^1$ is fixed in a keyway inside the hand-grip D. The stop F engages with the key $F^1$ and prevents further rotation of the shaft E which carries the blade supports C. This corresponds with the blade B reaching its limiting position. The blade or knife is moved to and fro by a knurled cylindrical handle $C^1$ attached to the blade support which gives greater control.

The blade is constructed with 25° taper sides $B^1$. The blade holder $B^2$ has a vice clamp G, H with a similar taper. The block H moving in a guide $H^1$ is held against the blade B by a knurled screw $H^2$. Since the blade is tapered it is consequently forced backwards into the holder. Screws $H^3$, $H^4$ passing through the back of the blade holder $B^2$ give any forward adjustment which may become necessary after the blade B has been reground, by engaging with the back $B^3$ of the blade.

The thickness of the skin which is cut depends upon the distance of the cutting edge of the blade B from the drum surface. This distance may be varied by means of cam mechanism, wherein an eccentrically mounted circular disc L carries a circular channel M into which a pin N projects. The pin N is fixed through the end of the blade support C. This support passes through a guide O to the blade holder. A graduated wheel P is attached to the shaft R on which the cams L are mounted, one for each end of the blade. Adjustment of the wheel P causes a simultaneous movement of the cams L which operate the two cam followers N, one fixed to each of the blade supports C. $L^1$ are the cam housings integral with the support guides O.

A very fine adjustment is thus possible, and both ends of the blade are moved simultaneously by equal amounts. The total blade movement from the drum surface=2.0 mm., and since the blade edge moves obliquely from this surface a suitable cam eccentricity=1.071 mm. The blade length=6 inches.

What I claim and desire to secure by Letters Patent is:

1. A dermatome comprising a part-cylindrical surface adapted to roll in contact with the body of a patient, a blade spaced from the said surface and mounted to rotate relatively to said surface about the axis thereof and also to move longitudinally to facilitate cutting, and stop means serving to limit the rotational movement of the blade at the end of the cutting operation.

2. A dermatome comprising a part-cylindrical surface adapted to roll in contact with the body of a patient, a blade support mounted to rotate and also to reciprocate relatively to said surface in spaced relationship thereto, a blade having at its ends surfaces which taper from its back towards its cutting edge, and means associated with the support for adjustably holding the blade in the support comprising a pair of adjustable stops against which the back of the blade rests and a pair of inclined jaws which correspond with and engage the said tapered surfaces on the ends of the blade.

LAURENCE JACK BISHOP.